(12) United States Patent
Jang et al.

(10) Patent No.: US 10,447,106 B2
(45) Date of Patent: Oct. 15, 2019

(54) FAN MOTOR

(71) Applicant: NEW MOTECH CO., LTD., Gwangju (KR)

(72) Inventors: Jeong Cheol Jang, Gwangju (KR); Gyeong Su Park, Gwangju (KR); Woo Sung Cho, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 100 days.

(21) Appl. No.: 15/832,776

(22) Filed: Dec. 6, 2017

(65) Prior Publication Data

US 2018/0175696 A1 Jun. 21, 2018

(30) Foreign Application Priority Data

Dec. 19, 2016 (KR) .................. 10-2016-0173508

(51) Int. Cl.

| H02K 1/04 | (2006.01) |
|---|---|
| H02K 5/15 | (2006.01) |
| H02K 5/00 | (2006.01) |
| H02K 5/10 | (2006.01) |
| H02K 7/14 | (2006.01) |
| H02K 11/30 | (2016.01) |
| F04D 25/06 | (2006.01) |
| F04D 29/66 | (2006.01) |

(52) U.S. Cl.
CPC ............ *H02K 5/15* (2013.01); *F04D 25/0606* (2013.01); *H02K 5/00* (2013.01); *H02K 5/10* (2013.01); *H02K 7/14* (2013.01); *H02K 11/30* (2016.01); *F04D 25/06* (2013.01); *F04D 29/661* (2013.01)

(58) Field of Classification Search
CPC .... F04D 25/06; F04D 25/0606; F04D 29/661; H02K 11/30; H02K 5/00; H02K 5/10; H02K 5/15; H02K 7/14
USPC ............................................ 310/89, 400–417
See application file for complete search history.

(56) References Cited

U.S. PATENT DOCUMENTS

| 6,170,275 | B1 * | 1/2001 | Ueno | .................... F04D 29/541 416/174 |
|---|---|---|---|---|
| 2009/0001843 | A1 * | 1/2009 | Enomoto | ............... H02K 1/145 310/257 |
| 2010/0154200 | A1 * | 6/2010 | Yang | ...................... H02K 1/185 29/596 |
| 2013/0270931 | A1 * | 10/2013 | Handa | ...................... H02K 1/32 310/43 |

(Continued)

FOREIGN PATENT DOCUMENTS

| JP | 2010-246203 A | 10/2010 |
|---|---|---|
| KR | 10-2016-0059313 A | 5/2016 |

*Primary Examiner* — Yuriy Semenenko
(74) *Attorney, Agent, or Firm* — Revolution IP, PLLC (57) ABSTRACT

A fan motor according to the present invention comprises a rotor 10 which rotates together with a shaft 30; a stator 20 which is installed to be oriented towards the rotor 10; a top-covering bracket 60 which is coupled to an upper insulator 21 and a core 22 constituting the stator 20; a motor bracket 80 which is mounted on a fixed-installation bracket 70 and coupled to the core 22, upper insulator 21 and lower insulator 23 of the stator 20 and a printed circuit board 50; and a sealing element 100 which is filled in a space portion S formed between a lower surface of the printed circuit board 50 coupled to the bottom of the lower insulator 23 and an inner lower surface of the motor bracket 80.

7 Claims, 13 Drawing Sheets

(56) References Cited

U.S. PATENT DOCUMENTS

| | | | | |
|---|---|---|---|---|
| 2013/0323094 A1* | 12/2013 | Jang | ............... | H02K 3/522 |
| | | | | 417/354 |
| 2015/0076934 A1* | 3/2015 | Jang | ............... | H02K 5/10 |
| | | | | 310/43 |
| 2015/0349594 A1* | 12/2015 | Zhang | ............... | H02K 9/19 |
| | | | | 417/423.7 |
| 2018/0048218 A1* | 2/2018 | Im | ............... | H02K 11/33 |
| 2018/0351431 A1* | 12/2018 | Kim | ............... | H02K 5/161 |

* cited by examiner

FAN MOTOR

TECHNICAL FIELD

The present invention relates to a fan motor. More specifically, the present invention relates to a fan motor which improves assemblability of a fan motor used for releasing cool air inside a refrigerator to the outside or circulating air inside and outside of devices such as thermo-hygrostats, thereby reducing manufacturing costs, preventing deviation of a stator and a rotor through a solid assembly and protecting a circuit element mounted on a printed circuit board at the same time.

BACKGROUND ART

In general, motors used for blowing cool air inside refrigerators or circulating air inside and outside of certain devices are referred to as fan motors. Fan motors are mostly installed in places where there is much moisture or environment where condensation occurs due to the change of a temperature. Moisture may enter the inside of a motor and cause a breakdown of the motor. Therefore, various structures for preventing the above have been researched.

Japanese Patent Laid-Open No. 2010-246203 and Korean Patent Laid-Open No. 2016-0059313 disclose a fan motor which applies two bearings for supporting an upper part and a lower part of a shaft.

The above-mentioned prior arts install two bearings at the top and bottom of the shaft, respectively, to rotate the shaft, and thus the construction resulting from installation of two upper and lower bearings is complex and manufacturing costs are increased. Additionally, the prior arts provide a structure of coupling a top-covering bracket and a fixed-installation bracket, and thus vibration generated when the rotor rotates may be delivered to upper and lower insulators and a core constituting the stator and bracket inner wall surfaces, thereby affecting the areas where these components are coupled to each other. Furthermore, deviation may occur because of position movement of the stator or breakdown of the rotor, etc., and noise may be generated from the vibration delivered.

Additionally, the printed circuit board electrically connected to coils wound around the stator is installed to contact an inner surface of the bottom-supporting bracket, and thus vibration generated when the rotor rotates may badly affect circuit components mounted on the printed circuit board, leading to malfunction of the motor and degradation of quality of the motor.

Accordingly, in order to solve the above-mentioned problems, the present inventors suggest a fan motor with a new structure which can be solidly and quickly assembled while reducing the number of components of the motor.

DETAILED DESCRIPTION OF INVENTION

Technical Task

It is an object of the present invention to provide a fan motor with a new structure.

It is another object of the present invention to provide a fan motor which installs one bearing on a shaft and forms a rotor on the shaft by insert molding, thereby improving assemblability and reducing manufacturing costs at the same time.

It is yet another object of the present invention to provide a fan motor which allows a solid coupling of a top-covering bracket and a motor bracket by means of a core of a stator, thereby preventing deviation of a stator assembly and a rotor.

It is yet another object of the present invention to provide a more reliable fan motor which prevents damage to a printed circuit board.

The above objects and other inherent objects of the present invention can be achieved by the present invention explained below.

Means for Solving the Technical Task

A fan motor according to the present invention includes a rotor 10 which rotates together with a shaft 30; a stator 20 which is installed to be oriented towards the rotor 10; a top-covering bracket 60 which is coupled to an upper insulator 21 and a core 22 constituting the stator 20; a motor bracket 80 which is mounted on a fixed-installation bracket 70 and coupled to the core 22, upper insulator 21 and lower insulator 23 of the stator 20 and a printed circuit board 50; and a sealing element 100 which is filled in a space portion S formed between a lower surface of the printed circuit board 50 coupled to the bottom of the lower insulator 23 and an inner lower surface of the motor bracket 80.

In the present invention, it is preferable that an inner boundary surface of a recessed portion 11 formed inside the center of the rotor 10 is arranged around an outer boundary surface of a fitting protrusion 81 protruding from the center of the motor bracket 80.

In the present invention, a plurality of guiding grooves 21', 23', 22' and 50' into which a plurality of longitudinal fixed guiding pieces 82 protruding from an inner surface of the motor bracket 80 at certain intervals are inserted may be formed in lower and upper edges of the upper and lower insulators 21 and 23, respectively, of the stator 20, a boundary surface of the core 22 and a boundary surface of the printed circuit board 50, respectively.

In the present invention, the top-covering bracket 60 may include a plurality of guiding grooves 61 formed at an edge of the top-covering bracket 60, into which the fixed guiding pieces 82 of the motor bracket 80 are inserted; and a plurality of semi-circular fixed pieces 62 protruding downwardly from an edge between the guiding grooves 61.

In the present invention, the top-covering bracket 60 may cover the guiding groove 21' formed in the upper insulator 21 of the stator 20 and the guiding groove 61 to be oriented towards each other. A lower surface of an edge of the top-covering bracket 60 may contact an upper surface of an edge of the upper insulator 21 of the stator 20, and an inner surface 62' of the semi-circular fixed piece 62 may contact a boundary surface 21A' of an upper edge 21A of the upper insulator 21. The contact portion may be fixed with an adhesive.

In the present invention, it is preferable that a projection 62" is formed inside the semi-circular fixed piece 62 of the top-covering bracket 60.

In the present invention, a groove 21A" into which the semi-circular fixed piece 62 is inserted may be formed in the upper edge 21A of the upper insulator 21, and the inner surface 62' of the semi-circular fixed piece 62 may be adhered to an inner surface of the groove 21A" formed in the upper edge 21A of the upper insulator 21 with an adhesive.

In the present invention, the motor bracket 80 may include the fitting protrusion 81 with a space portion 81' thereinside protruding from the center; the plurality of fixed guiding pieces 82 protruding inwardly from an inner boundary surface at certain intervals; an outlet hole 83 for a lead line 110 at one side of the motor bracket 80, electrically connected to the printed circuit board 50; and a fixed piece 84 for a fixed bolt 120 protruding outwardly.

Effect of the Invention

The present invention reduces the number of bearings installed and provides a shaft and a rotor as an integral body by insert molding, thereby allowing a quick assembly and reducing manufacturing costs. Additionally, the present invention is capable of easily and solidly coupling the stator, the top-covering bracket and the motor bracket, thereby preventing deviation of the rotor and the stator and preventing damage to components of the printed circuit board caused by vibration of the motor, so as to greatly increase reliability of the fan motor.

Hereinafter, the present invention will be explained in detail with reference to the attached drawings.

DETAILED CONSTITUTION FOR CARRYING OUT THE INVENTION

As illustrated in the drawings, a fan motor according to the present invention includes a rotor 10, a stator 20, a shaft 30, an oilless bearing 40, a printed circuit board 50, a top-covering bracket 60 made of a synthetic resin, a fixed-installation bracket 70 made of a synthetic resin which is attached to machines such as refrigerators, a motor bracket 80 made of a synthetic resin and a fan 90 inserted into the shaft 30 to rotate.

Figure 13:
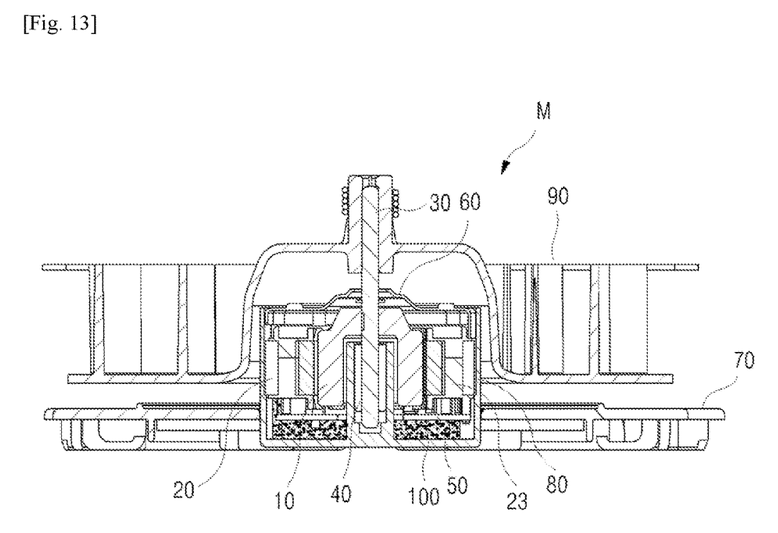
FIG. 13 is a cross-sectional view of a fan motor according to the present invention.

An entire assembly of the present invention will be explained in detail with reference to FIG. 13. The fan motor M of the present invention may include the rotor 10 which is insert molded on the shaft 30 to rotate together with the shaft 30, the stator 20 which is installed to be oriented towards the rotor 10, the top-covering bracket 60 which couples the upper insulator 21 and core 22 constituting the stator 20 and the motor bracket 80, the motor bracket 80 which is mounted on the fixed-installation bracket 70 and coupled to the core 22, upper insulator 21 and lower insulator 23 of the stator 20 and the printed circuit board 50, and the sealing element 100 which is filled in the space portion S formed between the lower surface of the printed circuit board 50 coupled to the bottom of the lower insulator 23 and the inner lower surface of the motor bracket 80.

The rotor 10 suggested in the present invention is insert molded on the shaft 30 as an integral body so as to rotate together with the shaft 30, thereby reducing the number of components when assembling the fan motor M, which allows a quick assembly. Additionally, as the shaft 30 rotates together with the rotor 10, movability of the shaft 30 can be reduced, thereby reducing the noise or vibration. Especially, the inner boundary surface of a recessed portion 11 formed inside the center of the rotor 10 is arranged around the outer boundary surface of a fitting protrusion 81 protruding from the center of the motor bracket 80, such that the center of gravity of the rotor 10 is in the outer boundary surface of the fitting protrusion 81. Accordingly, even if one oilless bearing 40 is installed on the shaft 30, the rotor 10 may smoothly rotate without any obstacles.

According to the present invention, the rotor 10 formed integrally with the shaft 30 uses one oilless bearing 40. Thus, the present invention can reduce the number of components of an assembly to secure a quick assembly process, and can greatly reduce manufacturing costs for mass production of the fan motor M.

The stator 20, the printed circuit board 50, the top-covering bracket 60 and the motor bracket 80 will be explained in detail with reference to FIG. 2 to FIG. 6 and FIG. 13.

Figure 1:
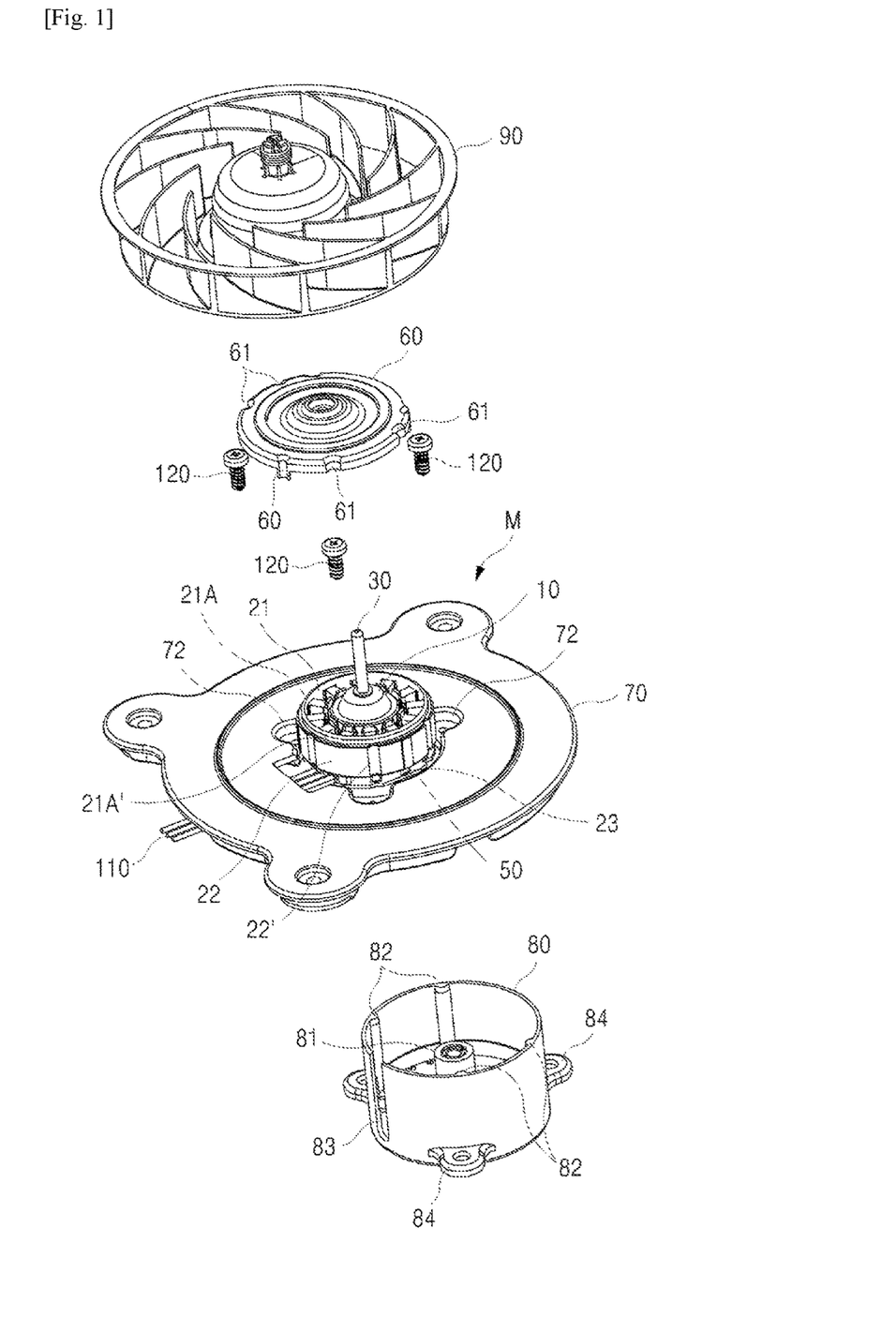
FIG. 1 is an exploded perspective view illustrating a fan motor according to the present invention.
Figure 2:
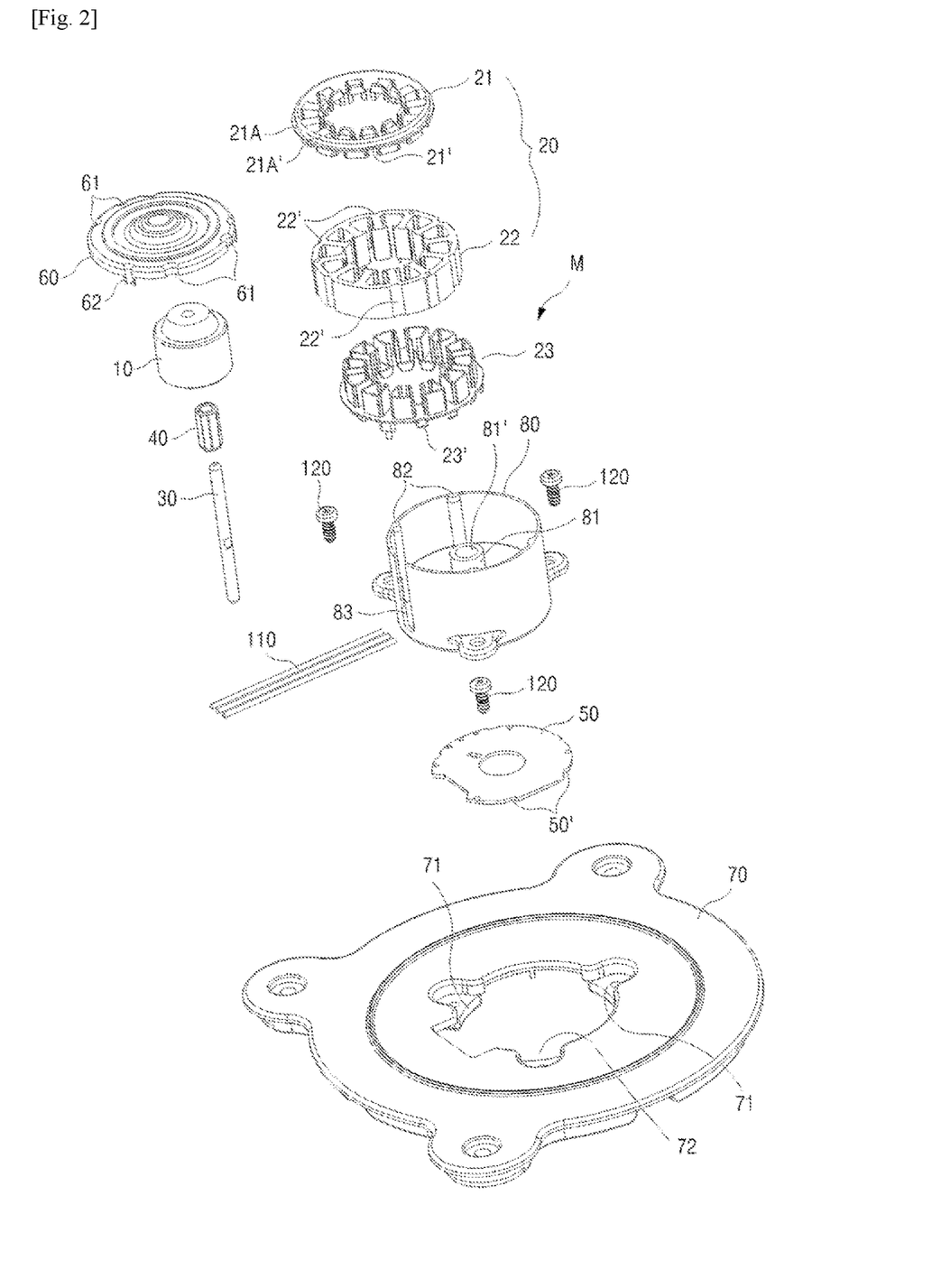
FIG. 2 is an exploded perspective view illustrating in detail a fan motor according to the present invention.
Figure 3:
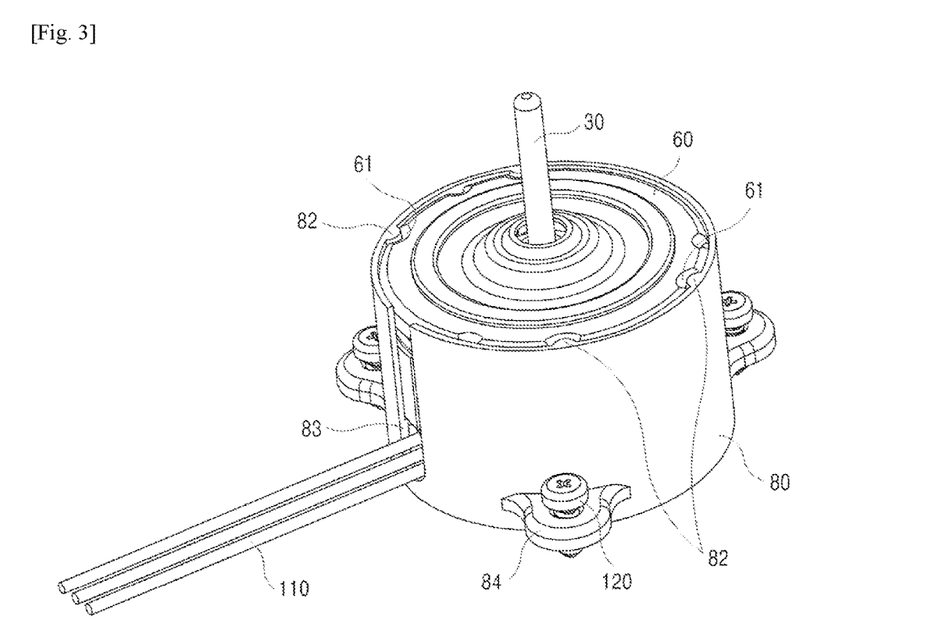
FIG. 3 is a perspective view illustrating a state of the present invention where a top-covering bracket is coupled to a motor bracket.

Guiding grooves 21' and 23' into which a plurality of longitudinal fixed guiding pieces 82 protruding from the inner surface of the motor bracket 80, which will be explained later, at certain intervals are inserted are formed in the lower and upper edges of the upper and lower insulators 21 and 23, respectively, of the stator 20. A plurality of guiding grooves 22' into which the fixed guiding pieces 82 of the motor bracket 80 are inserted are formed around the boundary surface of the core 22 constituting the stator 20. A plurality of guiding grooves 50' into which the fixed guiding pieces 82 of the motor bracket 80 are inserted are formed around the boundary surface of the printed circuit board 50.

Figure 4:
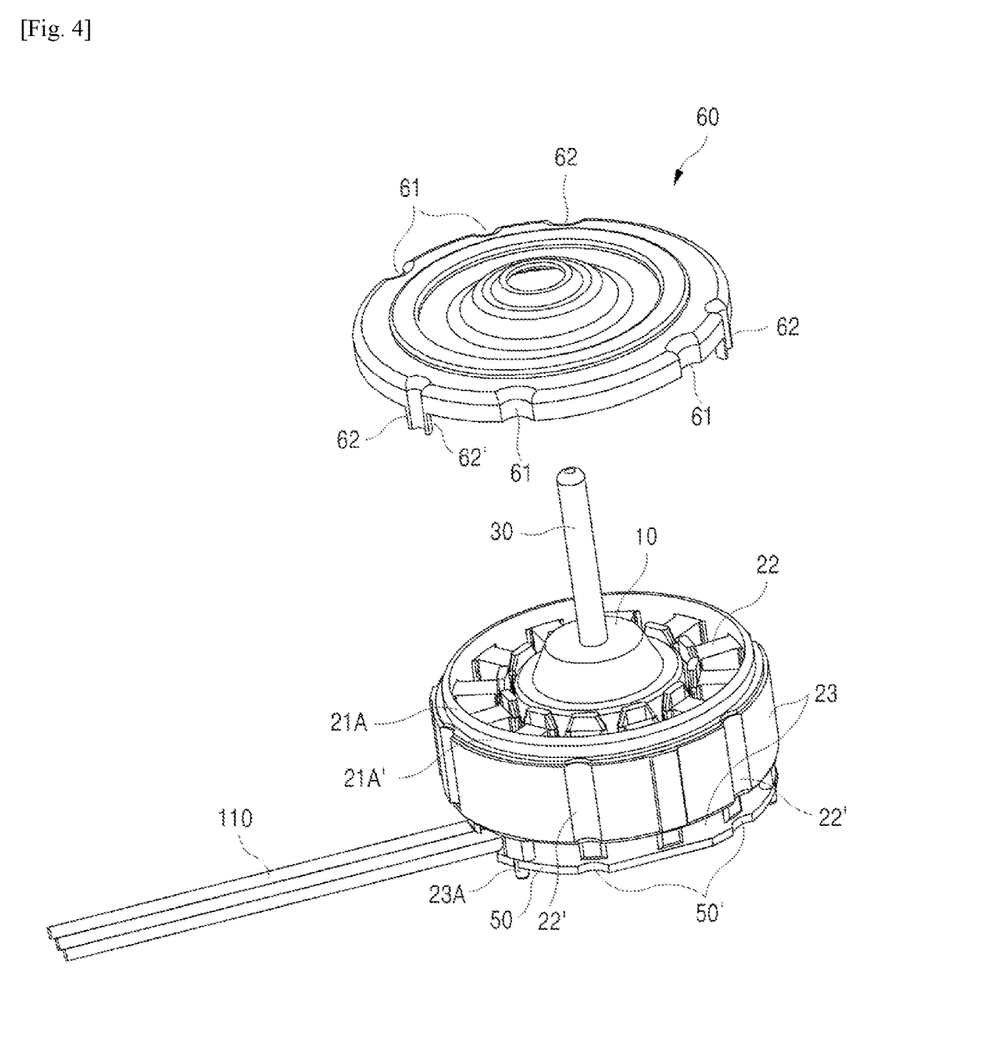
FIG. 4 is a perspective view illustrating a state of the present invention where a stator is separated from a top-covering bracket.
Figure 5:
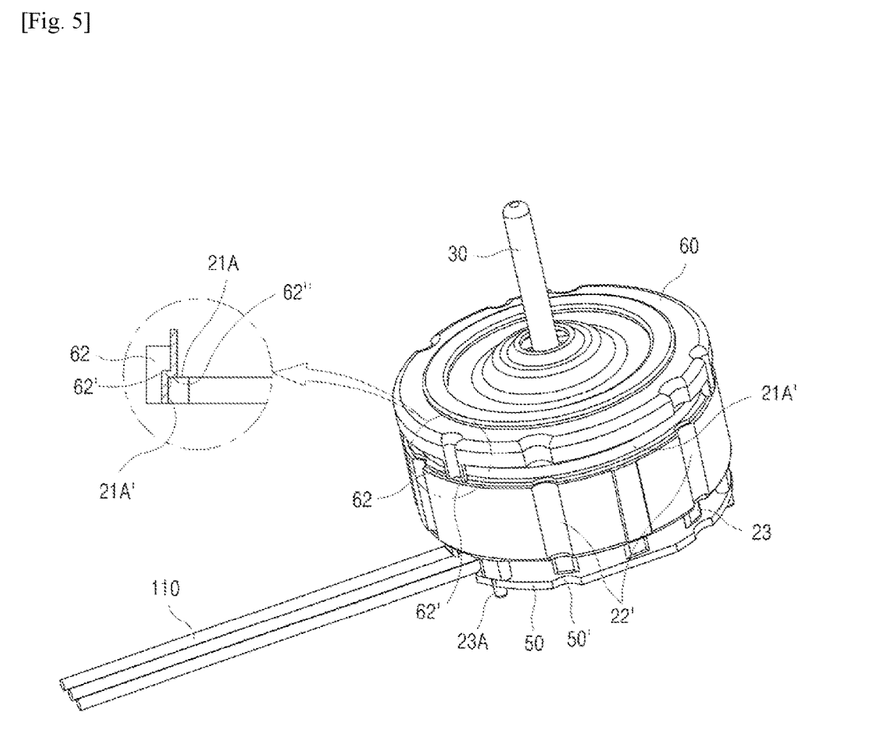
FIG. 5 is a perspective view illustrating a state of the present invention where a stator is coupled to a top-covering bracket.
Figure 6:
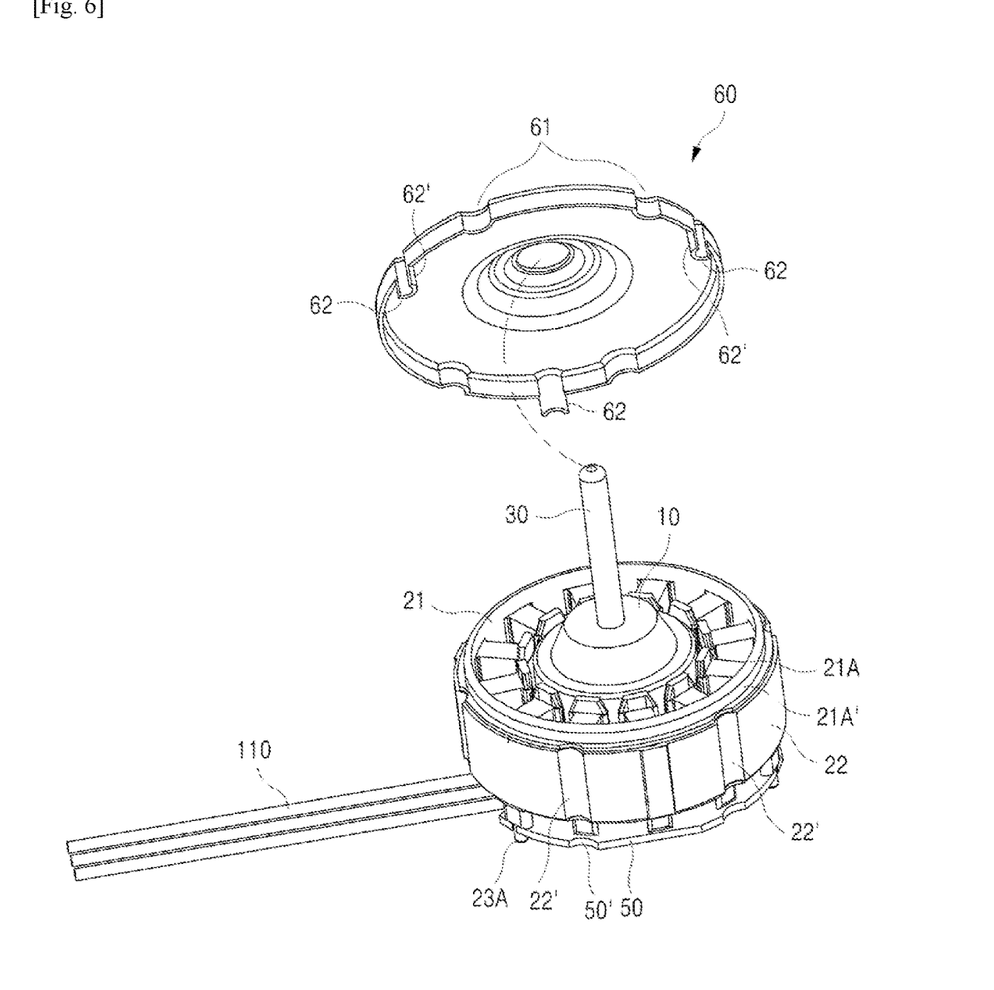
FIG. 6 is a perspective view illustrating a bottom surface of the top-covering bracket in FIG. 4.

The top-covering bracket 60 may include at its edge a plurality of guiding grooves 61 into which the fixed guiding pieces 82 of the motor bracket 80 are inserted and a plurality of semi-circular fixed pieces 62 protruding downwardly from an edge between the guiding grooves 61. The top-covering bracket 60 may cover the guiding groove 21' formed in the upper insulator 21 of the stator 20 and the guiding groove 61 to be oriented towards each other. The lower surface of the edge of the top-covering bracket 60 may contact the upper surface of the edge of the upper insulator 21 of the stator 20, and an inner surface 62' of the semi-circular fixed piece 62 may contact a boundary surface 21A' of the upper edge 21A of the upper insulator 21 to cover the upper insulator 21.

The inner surface 62' of the semi-circular fixed piece 62 of the top-covering bracket 60 is adhered to the boundary surface 21A' of the upper edge 21A of the upper insulator 21 with an adhesive (not illustrated), thereby preventing movement of the top-covering bracket 60 and preventing deviation of the top-covering bracket 60 in an upward direction by vibration generated when the rotor 10 rotates.

As represented by alternate long and short dash lines in FIG. 5, a projection 62" may be formed inside the semi-circular fixed piece 62 of the top-covering bracket 60 so that the projection 62" is stuck on the upper surface of the upper edge 21A of the upper insulator 21 and fixed using an adhesive.

Figure 11:
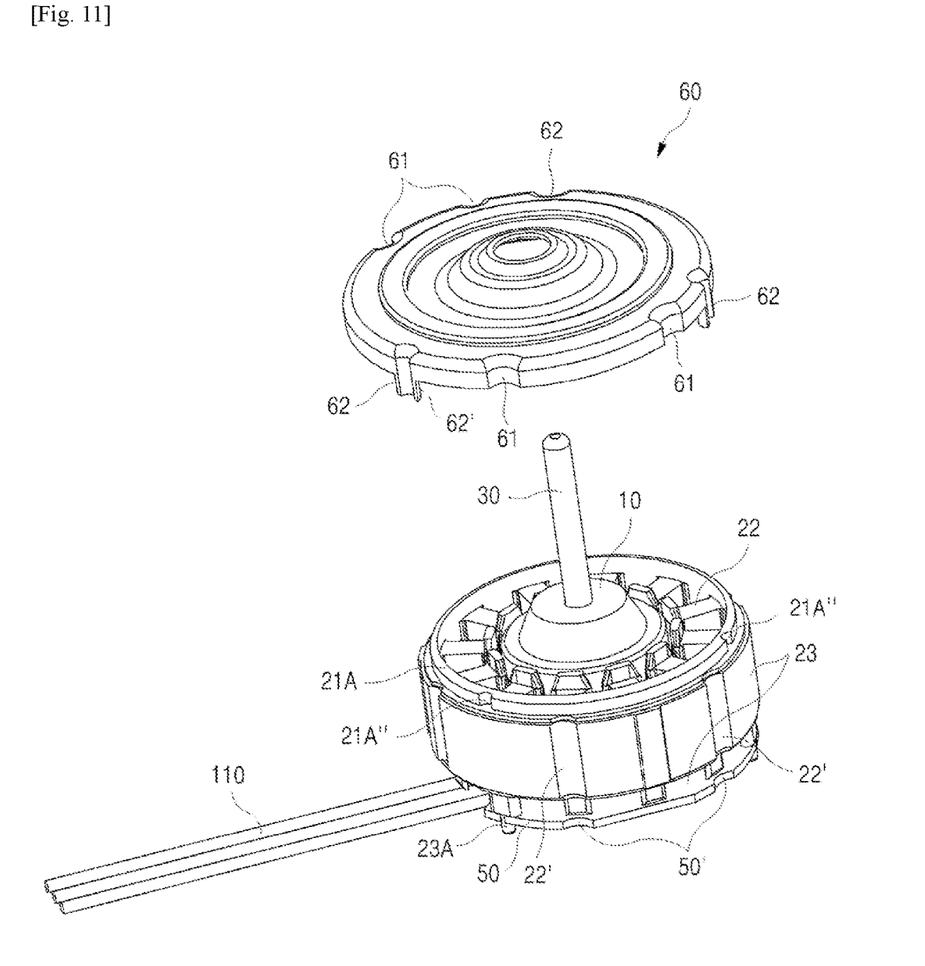
FIG. 11 is a perspective view illustrating a state according to another embodiment of the present invention where a stator is separated from a top-covering bracket in a fan motor.
Figure 12:
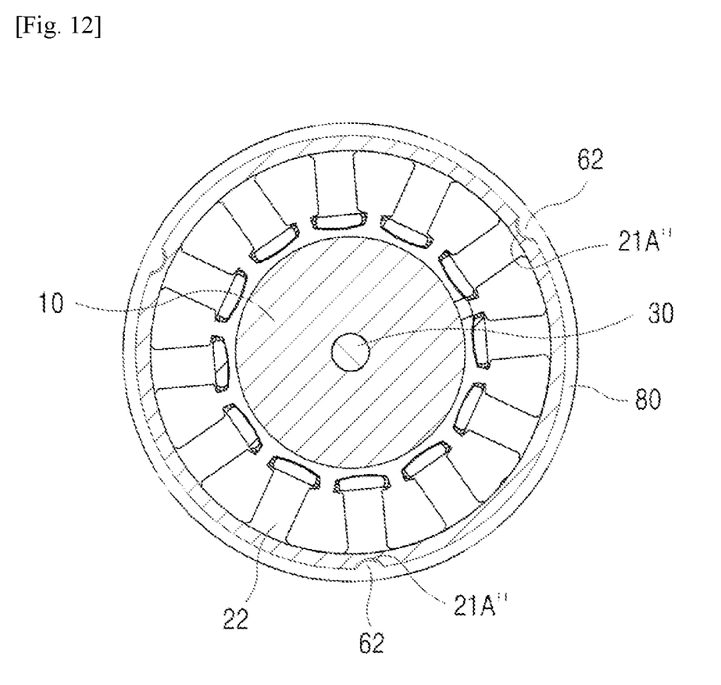
FIG. 12 is a plan view illustrating a stator in a fan motor according to another embodiment of the present invention.

As another embodiment of the present invention, as illustrated in FIG. 11 and FIG. 12, in order to cover the semi-circular fixed piece 62 of the top-covering bracket 60 on the upper insulator 21 more exactly and quickly, easy coupling may be possible by forming a groove 21A" into which the semi-circular fixed piece 62 is inserted in the upper edge 21A of the upper insulator 21 to fit the semi-circular fixed piece 62 to the groove 21A". In this case, the inner surface 62' of the semi-circular fixed piece 62 may be adhered and fixed to the inner surface of the groove 21A" formed in the upper edge 21A of the upper insulator 21 with an adhesive.

Figure 7:
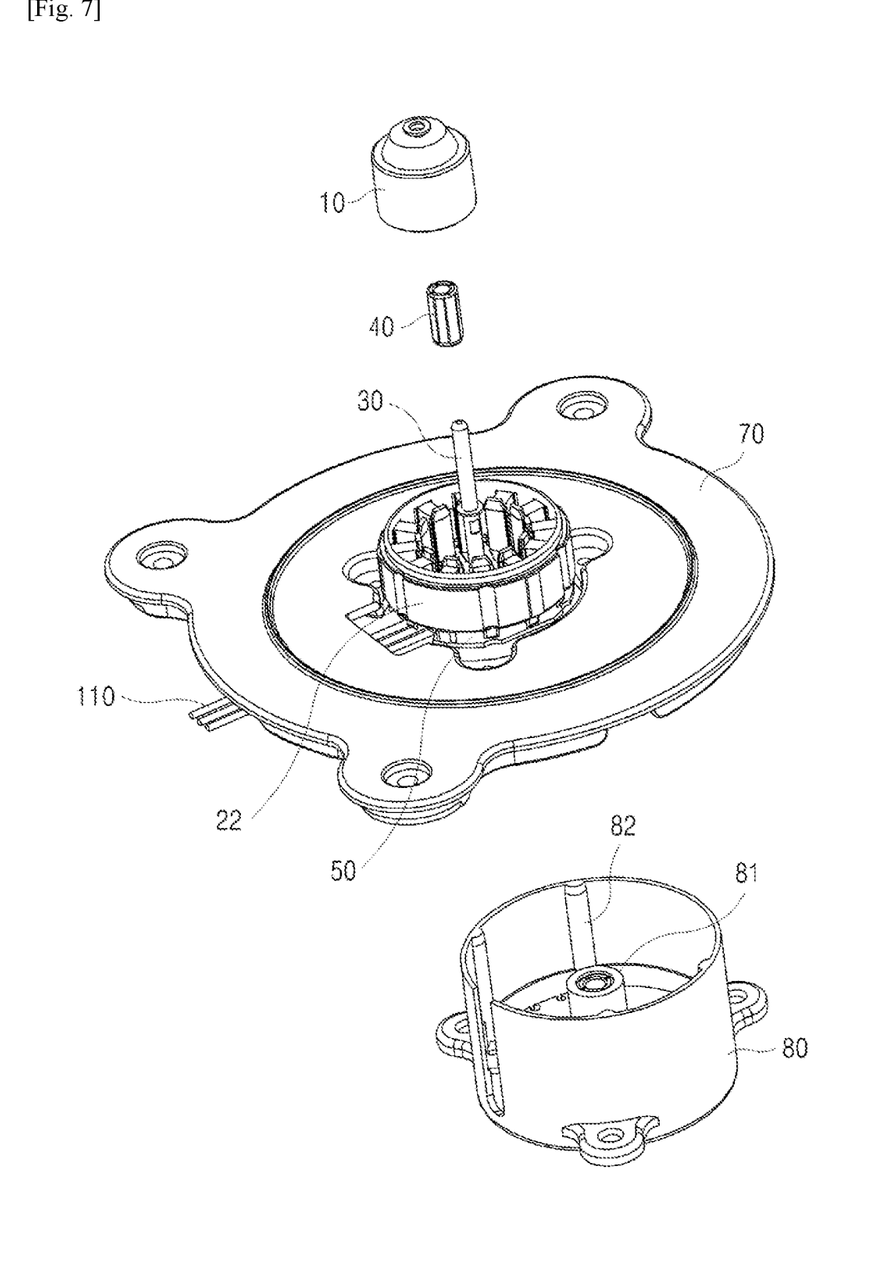
FIG. 7 is a perspective view illustrating a state of the present invention where a rotor is separated from an oilless bearing.

As stated above, the motor bracket 80 may include the fitting protrusion 81 with a space portion 81' thereinside protruding from the center, the plurality of fixed guiding pieces 82 protruding inwardly from the inner boundary surface at certain intervals, an outlet hole 83 for a lead line 110 at one side of the motor bracket 80, electrically connected to the printed circuit board 50, and a fixed piece 84 for a fixed bolt 120 protruding outwardly. The fixed piece 84 may be mounted on a projection 71 formed inside the fixed-installation bracket 70 and fixed with the fixed bolt 120 to install the motor bracket 80. The oilless bearing 40 inserted into the shaft 30 is arranged in the space portion 81' formed at the center of the fitting protrusion 81, as illustrated in FIG. 7.

In the present invention, the stator 20 is inserted around the rotor 10 to couple the motor bracket 80 and the stator 20 in a state where the upper and lower insulators 21 and 23 and the core 22 of the stator 20 are coupled to each other, and the printed circuit board 50 is coupled. In this case, the guiding groove 22' formed in the boundary surface of the core 22 is fitted to the fixed guiding piece 82 of the motor bracket 80, and the guiding grooves 21', 23' and 50' of the upper and lower insulators 21 and 23 and printed circuit board 50, respectively, are fitted to the fixed guiding pieces 82 of the motor bracket 80. Then, the fixed guiding piece 82 of the motor bracket 80 is inserted into the guiding groove 61 of the top-covering bracket 60. The top-covering bracket 60, the stator 20 and the motor bracket 80 are coupled to each other by means of the fixed guiding piece 82 of the motor bracket 80.

Since the top-covering bracket 60, the stator 20 and the motor bracket 80 are coupled to each other by being fitted to each other, a quick assembly is possible and a solid coupling is sustainable, thereby preventing deviation of the rotor 10 and the stator 20 by vibration, etc. generated when the rotor 10 rotates.

Figure 8:
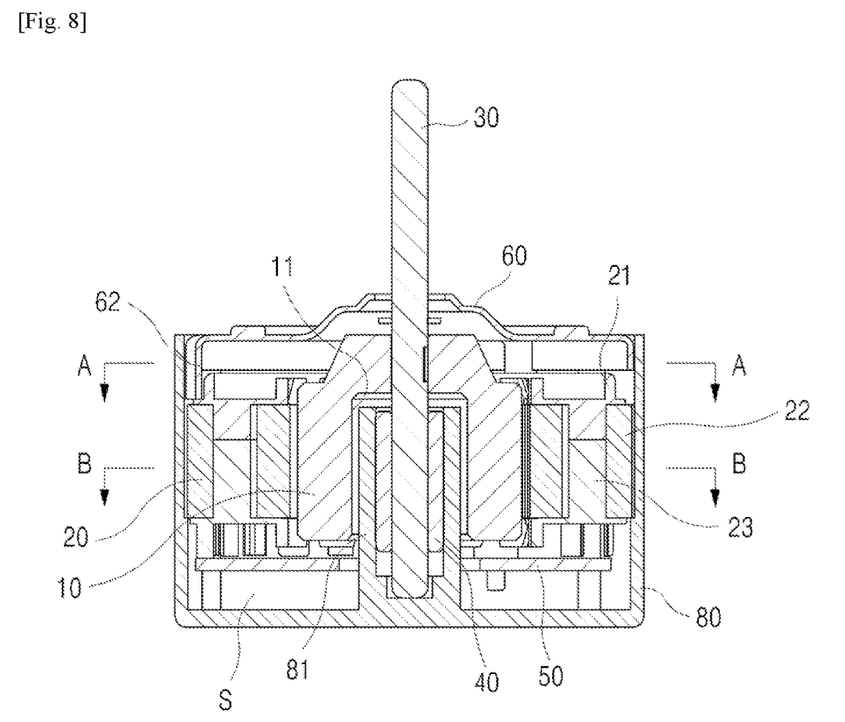
FIG. 8 is a cross-sectional view illustrating a state of the present invention where a top-covering bracket is coupled to a motor bracket.
Figure 9:
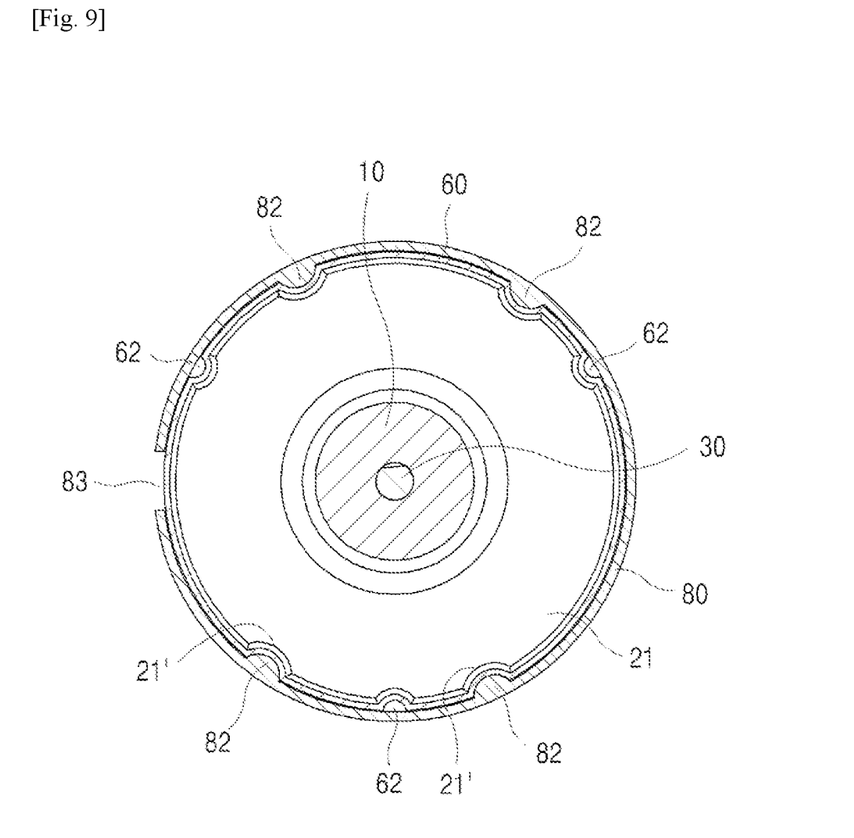
FIG. 9 is a cross-sectional view taken along line A-A in FIG. 8.
Figure 10:
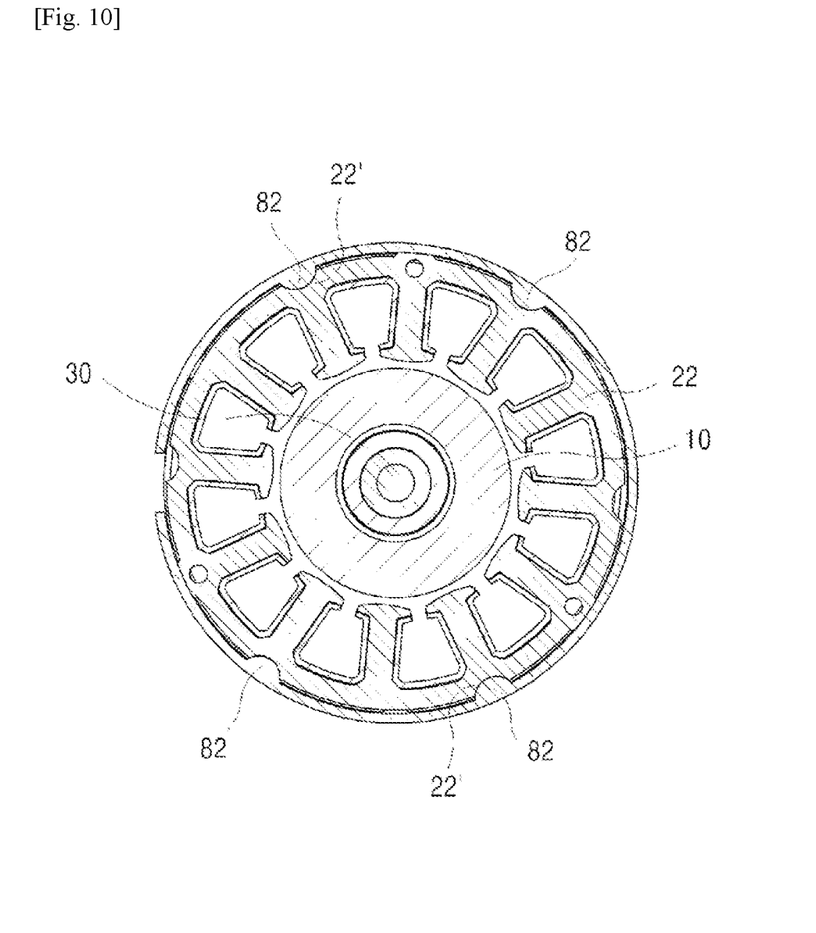
FIG. 10 is a cross-sectional view taken along line B-B in FIG. 8.

Meanwhile, the printed circuit board 50 is coupled by a fixed pin 23A protruding from the lower insulator 23 of the stator 20, as illustrated in FIG. 6. Additionally, as illustrated in FIG. 8 and FIG. 11, the sealing element 100 made of a synthetic resin is filled in the space portion S formed between the lower surface of the printed circuit board 50 coupled to the bottom of the lower insulator 23 and the inner lower surface of the motor bracket 80. Thus, the sealing element 100 buffers and protects the printed circuit board 50 from vibration generated when the rotor 10 rotates, thereby protecting circuit components mounted on the printed circuit board 50.

The sealing element 100 may be filled through an inlet 72 formed at the top of the projection 71 formed inside the fixed-installation bracket 70 after the motor bracket 80 is coupled to the fixed-installation bracket 70.

Embodiments in the detailed description of the present invention are presented only to help understand the present invention, not to limit the scope of the present invention. The scope of the present invention is defined by the appended claims, and it should be interpreted that simple modifications or changes within the scope of the claims fall within the scope of the present invention.

What is claimed is:

1. A fan motor, comprising:
   a rotor (10) which rotates together with a shaft (30);
   a stator (20) which is installed to be oriented towards the rotor (10);
   a top-covering bracket (60) which is coupled to an upper insulator (21) and a core (22) constituting the stator (20);
   a motor bracket (80) which is mounted on a fixed-installation bracket (70) and coupled to the core (22), upper insulator (21) and lower insulator (23) of the stator (20) and a printed circuit board (50); and
   a sealing element (100) which is filled in a space portion (S) formed between a lower surface of the printed circuit board (50) coupled to the bottom of the lower insulator (23) and an inner lower surface of the motor bracket (80),
   wherein an inner boundary surface of a recessed portion (11) formed inside the center of the rotor (10) is arranged around an outer boundary surface of a fitting protrusion (81) protruding from the center of the motor bracket (80).

2. The fan motor according to claim 1, wherein a plurality of guiding grooves (21', 23', 22' and 50') into which a plurality of longitudinal fixed guiding pieces (82) protruding from an inner surface of the motor bracket (80) at certain intervals are inserted are formed in lower and upper edges of the upper and lower insulators (21 and 23), respectively, of the stator (20), a boundary surface of the core (22) and a boundary surface of the printed circuit board (50), respectively.

3. The fan motor according to claim 1, wherein the top-covering bracket (60) comprises a plurality of guiding grooves (61) formed at an edge of the top-covering bracket (60), into which the fixed guiding pieces (82) of the motor bracket (80) are inserted; and a plurality of semi-circular fixed pieces (62) protruding downwardly from an edge between the guiding grooves (61).

4. A fan motor, comprising:
   a rotor (10) which rotates together with a shaft (30);
   a stator (20) which is installed to be oriented towards the rotor (10);
   a top-covering bracket (60) which is coupled to an upper insulator (21) and a core (22) constituting the stator (20);
   a motor bracket (80) which is mounted on a fixed-installation bracket (70) and coupled to the core (22), upper insulator (21) and lower insulator (23) of the stator (20) and a printed circuit board (50); and a sealing element (100) which is filled in a space portion (S) formed between a lower surface of the printed circuit board (50) coupled to the bottom of the lower insulator (23) and an inner lower surface of the motor bracket (80), wherein the top-covering bracket (60) comprises a plurality of guiding grooves (61) formed at an edge of the top-covering bracket (60), into which the fixed guiding pieces (82) of the motor bracket (80) are inserted; and a plurality of semi-circular fixed pieces (62) protruding downwardly from an edge between the guiding grooves (61), and wherein the top-covering bracket (60) covers the guiding groove (21') formed in the upper insulator (21) of the stator (20) and the guiding groove (61) to be oriented towards each other, wherein a lower surface of an edge of the top-covering bracket (60) contacts an upper surface of an edge of the upper insulator (21) of the stator (20), and an inner surface (62') of the semi-circular fixed piece (62) contacts a boundary surface (21A') of an upper edge (21A) of the upper insulator (21) to fix the contact portion with an adhesive.

5. The fan motor according to claim 4, wherein a groove (21A") into which the semi-circular fixed piece (62) is inserted is formed in the upper edge (21A) of the upper insulator (21), and the inner surface (62') of the semi-circular fixed piece (62) is adhered to an inner surface of the groove (21A") formed in the upper edge (21A) of the upper insulator (21) with an adhesive.

6. A fan motor, comprising:

a rotor (10) which rotates together with a shaft (30);

a stator (20) which is installed to be oriented towards the rotor (10);

a top-covering bracket (60) which is coupled to an upper insulator (21) and a core (22) constituting the stator (20);

a motor bracket (80) which is mounted on a fixed-installation bracket (70) and coupled to the core (22), upper insulator (21) and lower insulator (23) of the stator (20) and a printed circuit board (50); and a sealing element (100) which is filled in a space portion (S) formed between a lower surface of the printed circuit board (50) coupled to the bottom of the lower insulator (23) and an inner lower surface of the motor bracket (80), wherein the top-covering bracket (60) comprises a plurality of guiding grooves (61) formed at an edge of the top-covering bracket (60), into which the fixed guiding pieces (82) of the motor bracket (80) are inserted; and a plurality of semi-circular fixed pieces (62) protruding downwardly from an edge between the guiding grooves (61), and wherein a projection (62") is formed inside the semi-circular fixed piece (62) of the top-covering bracket (60).

7. A fan motor, comprising:

a rotor (10) which rotates together with a shaft (30);

a stator (20) which is installed to be oriented towards the rotor (10);

a top-covering bracket (60) which is coupled to an upper insulator (21) and a core (22) constituting the stator (20);

a motor bracket (80) which is mounted on a fixed-installation bracket (70) and coupled to the core (22), upper insulator (21) and lower insulator (23) of the stator (20) and a printed circuit board (50); and a sealing element (100) which is filled in a space portion (S) formed between a lower surface of the printed circuit board (50) coupled to the bottom of the lower insulator (23) and an inner lower surface of the motor bracket (80), wherein the motor bracket (80) comprises the fitting projection (81) with a space portion (81') thereinside protruding from the center; the plurality of fixed guiding pieces (82) protruding inwardly from an inner boundary surface at certain intervals; an outlet hole (83) for a lead line (110) at one side of the motor bracket (80), electrically connected to the printed circuit board (50); and a fixed piece (84) for a fixed bolt (120) protruding outwardly.

* * * * *